Jan. 17, 1950  L. J. STEPHENSON  2,494,840
AUTOMATIC SOLDERING IRON CONTROL
Filed Dec. 27, 1945

Inventor
Louis J. Stephenson

By Clarence A. O'Brien
and Harvey B. Jacobson
Attorneys

Patented Jan. 17, 1950

2,494,840

UNITED STATES PATENT OFFICE 2,494,840

AUTOMATIC SOLDERING IRON CONTROL

Louis J. Stephenson, New Bern, N. C.

Application December 27, 1945, Serial No. 637,447

3 Claims. (Cl. 219—23)

This invention relates to an automatic soldering iron control, including means adapted to support the soldering iron when not in use and to control and reduce the current voltage flow thereto and heating or temperature thereof at such time to prevent the soldering iron bit or tip from burning or losing its original tinning on prolonged jobs of soldering, such as in radio work, etc.

Another object of the invention is to provide an automatic soldering iron control which includes a support or rest for the iron when not in use with reduced voltage to the iron, and which upon the iron being removed therefrom, will maintain the iron at the proper heat for use at all times, when in use, without the iron overheating and destroying the original tin coating on the tip of the copper bit, by impressing an idle heat voltage on the iron when not in use and supported on the rest.

Another object of the invention is to provide means for indicating the amount of heat in the idle position, such indicating means being in the form of a visual signal or jeweled pilot lamp and to provide an iron which may be operated on either A. C. or D. C. current and which will accommodate all 110 volt sizes up to and including 150 watt size, or otherwise, according to the capacity set therefor.

Another object is to provide control means in the form of a rheostat or adjustable resistance by which to vary or adjust the idle heat of the iron.

Another object of the invention is to provide a rest for the iron when not in use, which will automatically shunt the circuit through a resistance or resistor of proper capacity termed a "dropping resistor" to reduce the current voltage to the iron and the heat on the iron tip when not in use, but which will automatically cause the closing of the circuit to the iron independently of the resistance or by shunting out the resistor when the iron is in use, so that the iron will be maintained at the proper heat or temperature at all times during use.

Another object of the invention is to provide means in the form of a dropping resistor for controlling the degree of brightness of the pilot lamp or visual indicator which will indicate the amount of heat in the iron in the idle position or when not in use and supported on the rest.

Another object of the invention is to provide a device, which is relatively compact, and can be economically produced, and which will comply with all the requirements and rulings of the National Board of Fire Underwriters.

Other objects and advantages reside in the details of construction and operation as more fully hereinafter described and claimed, reference being had to the accompanying drawings forming part hereof, wherein like numerals refer to like parts throughout, and in which—

Figure 1:
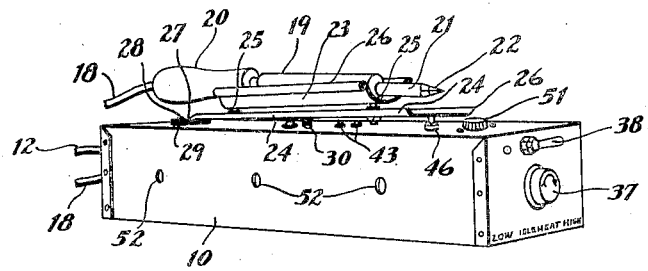
Figure 1 is a perspective view of an automatic soldering iron control including a rest for the iron and showing the iron thereon, when not in use.
Figure 2:
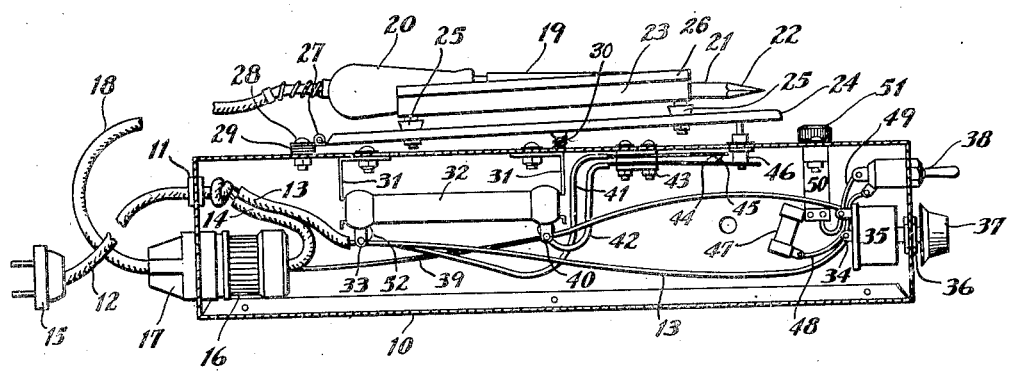
Figure 2 is an enlarged longitudinal sectional view thereof.

Referring to the drawings in detail, in which like reference characters designate corresponding parts throughout the several views, 10 indicates an elongated rectangular box in the form of a housing or casing, preferably of light sheet aluminum or otherwise, having a bushing 11 at one end through which a cable 12 enclosing the feed or line wires 13 and 14 is passed and which may be provided with a plug 15 at its free end, for plugging into a supply circuit, such as the house wiring or wall socket in a building to a 110 volt A. C. or D. C. outlet or line of such voltage. The end of the case is also provided to support a socket 16 therein, flush with the end of the case to receive a plug 17 through an opening in the case at this point, from which a cable 18 leads to the iron 19 having the usual handle 20 and the copper bit 21 having the usual tinned coating on the tip 22 thereof.

When the iron is not in use, it is adapted to be supported upon a rest 23 shown in the form of a U-shaped or channel iron member, bolted to and insulated from a rest support 24 as indicated at 25 near opposite ends of the rest 23. The support 25 like the rest 23, may be fabricated from sheet aluminum, and is correspondingly shaped except that it is more shallow, the side portions being turned in each instance as indicated at 26 in order to add stiffness thereto. One end of the support 24 is hinged as at 27 to the top of the box or case 10, to which it is bolted through openings therein as indicated at 28 but insulated therefrom as indicated at 29, so as to support the rest at its hinged or pivoted end to swing like an arm, up and down, in spaced relation to the top of the case 10. The support and rest are maintained upwardly by means of a spring 30 between the support 24 and the top of the case, and insulated therefrom. Supported beneath and suspended from the top of the case in a pair of spaced brackets 31 bolted thereto, is a resistance or dropping resistor 32 which by way of example for the circuit voltage specified may be of 100 ohm-100 watt capacity. The line wire 13 is connected to one terminal 33 of the resistor 32 and from thence, leads to one terminal 34 of a rheostat or adjustable resistance 35 mounted in the opposite end of the case as indicated at 36 and capable of control by a knob 37 suitably calibrated or dialed to show idle heat setting, high or low heat, which may be marked on the end of the case. Connection is then made to a suitable switch 38 also mounted in the end of the case and shown in the form of a toggle switch of the single throw, single pole type. This switch 38 is connected across the main resistance or dropping resistor 32, the other lead wire 14 extending to the socket 16 through which connection is made by plugging in the extension cord or cable 18 to connect the iron 19 therewith. The other side of the socket 16 is connected by a conductor 39 to the other terminal 40 of the resistor 32 and from thence, to the other terminal of the switch 38. The terminals 33 and 40 are also connected by conductors 41 and 42 to a switch 43 bolted to the top of the case and insulated therefrom, and including spring contacts 44 and 45 which are normally engaged when the iron is removed from the rest for use and the support 27 is held upwardly by the spring 30 but are separated when the iron is supported on the rest and exerts downward pressure and movement thereon under its weight against the spring 30, by reason of the connection of the support 24 through the top of the case with the spring contact 45 and insulated therefrom as indicated at 46, so as to depress the contact 45 out of engagement with the contact 44 to cut in the resistor or resistance 32 and cause the current to flow through the resistor 32 to the iron or heating element thereof thereby reducing the voltage to idle heat value. When the iron is supported on the rest, the voltage is reduced to the proper value for an idle heat, which will not burn away the original tinned coating from the iron bit or tip, the weight of the iron serving this purpose when supported on the rest by opening the contacts 44 and 45. For this purpose, the resistor or dropping resistance 32, and a resistor or dropping resistance 47 is disposed in series with the iron, thereby decreasing the voltage to the iron to about 75 volts for an idle heat, within the capacity stated, and under the supply voltage indicated, which is insufficient to burn away the tinned coating on the tip of the bit. The resistor or dropping resistance 47 of 100 ohm-10 watt capacity is connected to switch 38 and a pilot lamp 51. For this purpose, connection is made from resistor 47 by a conductor 48 through one side of the switch 38 and the other side connects by a conductor 49 with the terminal 50 of a bracket supporting the socket of a signal device shown in the form of a jeweled signal or pilot lamp 51 mounted in the top of the case and also having the other terminal thereof connected to the other terminal of the resistor or dropping resistance 47. The latter resistance is preferably of lower capacity than the resistor 32, for the voltage stated, being preferably 100 ohms and 10 watts and the pilot or signal lamp being a Mazda 313, 28 volt lamp. The adjustable resistance or rheostat 35 is preferably of 25 ohm at one ampere.

Figure 3:
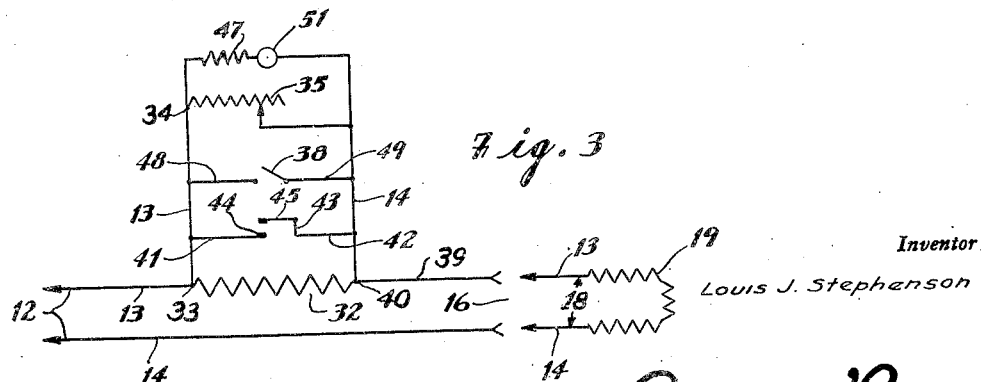
Figure 3 is a schematic view of the wiring diagram of the device.

From the schematic wiring diagram shown in Figure 3, it will be seen that the entire control group is connected in series with the iron and that when the iron is picked up for use, the contacts 44 and 45 engage, thus closing the circuit therethrough and shunting out the resistor 32 which is in circuit while the iron is supported on the rest and the circuit through the contacts 44 and 45 is open. This allows full voltage to be impressed on the heating element of the iron 19, so as to maintain the same at the proper heat or temperature for use, and including the tip thereof by shunting or cutting out the resistor 32 but rendering the circuit subject to control by the adjustable resistance or rheostat 35, while when not in use, the tip is prevented from burning out or losing its original tinning. The adjustable resistance or rheostat 35 is shunted across the resistor 32, which is the main resistor of the circuit to the iron to prevent burning away the original tin coating of the iron bit when the iron is in use and the current to the resistance 32 is shunted through the rheostat 35 to the iron while when the voltage to the heating element thereof is reduced when the iron is supported on the rest, such as to 75 volts, and this resistance 35, being adjustable, may be adjusted for any desired increase in the idle heat up to approximately full heat or full voltage. This may be desirable where the iron is supported for very short periods when in use for long periods, said resistance is set lower, and the voltage reduced to approximately 75 volts as above stated. The pilot or signal light 51 is connected across the main dropping resistance 32 and through the resistance 47 but may be any other form of signal and the lamp will light brightly when the automatic feature is adjusted to low idle heat, dimming upon an increase in the rheostat setting for high idle heat, thus indicating the condition of the circuit voltage when the iron is at rest and it is desired that the voltage therethrough should be lowered and when in use. The purpose of the switch 38, is to cut out the automatic feature of the resistance if it should be desired to heat the iron quickly. It is also to be understood that proper provision is made to insulate all of the parts that are electrically disconnected so that there is no danger of shocks or grounds occurring. The advantage of the device is that one can solder continuously without danger of the iron overheating during its period of rest and when picked up for use, the temperature of the bit is exactly right for soldering. The device has been thoroughly tested in service and has been found to be reliable and efficient. For quick heating to operating heat, the switch 38 is closed manually, thereby short-circuiting the resistor 32 and applying full line voltage to the iron. With the contacts 44 and 45 open and the iron at rest on the support, the green or other colored jeweled signal or pilot lamp is lighted by voltage drop across the resistor 32 and by adjusting the variable resistance or rheostat 35 by the knob 37, which is connected in shunt across the dropping resistance 32, the voltage drop across said resistor may be varied, thereby raising or lowering the voltage applied to the iron when at rest. This feature gives an idle heat adjustment to suit the particular iron in use on the particular job at hand. When the iron is operating at high idle heat, the lamp or signal is dimmed, the amount of brightness indicating the degree of high or low idle heat. When the lamp is bright, it indicates low idle heat and dim or dark indicates high idle heat. The dropping resistor 47 is connected in series with the pilot lamp or signal 51, as indicated in the schematic circuit shown in Figure 3. The main or primary dropping resistor 32 is short-circuited when the iron is removed from the rest and support, so as to allow full line voltage to be applied to the iron heating element for an immediate return of the iron to good soldering heat. Also, vent holes 52 may be provided in the sides of the housing formed by the box or casing 10 for cooling purposes.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. An automatic heat controlling means for electrically heated soldering irons comprising a heating element for the soldering iron, incorporated into the same, an operative circuit for said heating element, a supply circuit connected with said operative circuit, a high resistance element permanently included in said operative circuit in series with the heating element, reducing the current flow through the same, a support for the soldering iron when not in use, a normally closed switch, actuated and opened by the weight of the soldering iron when supported and acting on the support, a shunt circuit bridging said high resistance, controlled by said normally closed switch, making the high resistance ineffective when the switch is closed, a further shunt circuit bridging the high resistance, arranged in parallel to the said first named shunt circuit, adjustable resistance means for limiting the current flow through the said further shunt circuit arranged in the same, said further shunt circuit controlling the flow of current through the heating element when the tool is idle and supported by the support, a further shunt circuit bridging the high resistance, containing a manually operated switch, adapted to short circuit the permanently included high resistance and the last named adjustable resistance element for applying full heat to the soldering iron when resting on its support.

2. An automatic heat controlling means for electrically heated soldering irons comprising a heating element for the soldering iron, incorporated into the same, an operative circuit for said heating element, a supply circuit connected with said operative circuit, a high resistance element permanently included in said operative circuit in series with the heating element, reducing the current flow through the same, a support for the soldering iron when not in use, a normally closed switch, actuated and opened by the weight of the soldering iron when supported and acting on the control, a shunt circuit bridging said high resistance, controlled by said normally closed switch, making the high resistance ineffective when the switch is closed, a further shunt circuit bridging the high resistance, arranged in parallel to the said first named shunt circuit, adjustable resistance means for limiting the current flow through the said further shunt circuit arranged in the same, said further shunt circuit controlling the flow of current through the heating element when the tool is idle and supported by the support, a further shunt circuit bridging the high resistance, containing a manually operated switch, adapted to short circuit the permanently included high resistance and the last named adjustable resistance element for applying full heat to the soldering iron when resting on its support, a still further shunt circuit in parallel to the other shunt circuits bridging the high resistance, said last named shunt circuit containing a signal and a dropping resistance to indicate the current flow and the value of the voltage drop across the permanently enclosed high resistance in the operative circuit and its shunt circuit.

3. In an automatic heat controller for soldering irons, a stand including a box and a pivotally mounted support for the soldering iron, said soldering iron being provided with an incorporated heating element, an operative circuit for the said heating element, a permanently included high resistance element provided with terminals, connected with said operative circuits, a plurality of shunt circuits connected with said terminals, a pair of contact springs normally closed, an operating depressor member acting on said springs, a movable supporting member under the movable end of the pivoted support, adapted to operate said depressor member under the weight of the soldering iron when laid on the support, said contact springs being opened by said depressor member, an adjustable resistance member of lower resistance than the high resistance member mounted within said box, and provided with a member for adjusting the resistance protruding from the box, and included in a further shunt circuit, a signal light mounted on the top of the box and a resistance connected in series with the said signal light, mounted in the interior of the box, the said series connection of signal light and resistance being included in a further shunt circuit connected with the terminals of the aforesaid high resistance, the resistance in series with the signal light being higher than the aforesaid high resistance, said light indicating the voltage drop across the terminals of the high resistance, as produced by the latter and by the combined action of the shunt circuits, a manually operated switch included in a further shunt circuit connected across the terminals of the aforesaid high resistance, and a supply circuit for the operative circuit of the heating element to provide the same with current during the working period and during the idle period, the current supply during the last named period being controlled by the combined action of the high resistance permanently included in the operative circuit of the heating element and the shunt circuits in parallel to the same, the manually operating switch providing full heat to the heating element while the soldering iron is idle.

LOUIS J. STEPHENSON.

REFERENCES CITED

The following references are of record in the file of this patent:

UNITED STATES PATENTS

| Number | Name | Date |
|---|---|---|
| 2,326,572 | Shangle | Aug. 10, 1943 |
| 2,405,270 | Riess | Aug. 6, 1946 |